(12) United States Patent
Lee

(10) Patent No.: US 6,230,702 B1
(45) Date of Patent: May 15, 2001

(54) BAKING OVEN WITH ADJUSTABLE BAKING SPACE

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 0 days.

(21) Appl. No.: 09/603,345

(22) Filed: Jun. 26, 2000

(51) Int. Cl.[7] .............................. F23M 7/00; F24C 15/04
(52) U.S. Cl. ...................... 126/198; 126/194; 126/275 E; 219/525; 219/386
(58) Field of Search .................................. 126/198, 194, 126/190, 275 E, 275 R, 273.5, 273 R; 219/385, 386, 525, 452.13, 453.13, 453.14; 312/249.1, 249.7, 327, 328; 99/374, 375, 378, 379

(56) References Cited

U.S. PATENT DOCUMENTS

| | | | |
|---|---|---|---|
| 2,033,060 | * | 3/1936 | Anderson ................................ 99/379 |
| 2,710,906 | * | 6/1955 | Lipsich et al. ........................ 219/525 |
| 2,765,727 | * | 10/1956 | Lipsich et al. ........................ 219/525 |
| 3,121,385 | * | 2/1964 | Funke et al. ............................ 99/374 |
| 3,848,110 | * | 11/1974 | Giguere et al. ........................ 219/525 |
| 3,852,569 | * | 12/1974 | Potvin .................................... 219/525 |
| 4,027,139 | * | 5/1977 | Theimer .................................. 219/525 |
| 4,206,345 | * | 6/1980 | Maass et al. .......................... 219/525 |
| 4,241,650 | * | 12/1980 | John et al. ............................. 219/525 |
| 4,571,456 | * | 2/1986 | Paulsen et al. ........................ 248/455 |

* cited by examiner

Primary Examiner—Ira S. Lazarus
Assistant Examiner—Josiah C. Cocks

(57) ABSTRACT

A baking oven with a movable up-and-down cover includes a housing and a cover movable up and down to close on an open upper side of the housing to adjust an inner hollow chamber of a baking oven after the cover is adjusted in its height and closed on the housing so as to save baking time and electric power used. The cover is adjusted in its height relative to the housing by means of two insert members having two ends selectably engaging one of plural vertical holes in a position means respectively fixed on two opposite side walls of the housing, and the insert members are moved inward or outward by a press button each in two grips fixed on two opposite sides of the cover to engage or disengage one of the position holes of the position member.

2 Claims, 7 Drawing Sheets

BAKING OVEN WITH ADJUSTABLE BAKING SPACE

BACKGROUND OF THE INVENTION

This invention relates to a backing oven with a movable up-and-down cover, particularly to one having a cover movable up-and-down according to the size of an object to be baked by pressing a press button in an immovable grip to press inward an insert member positioned in a side wall of the cover so that the cover may be raised up or lowered down to close up a housing. Thus, the interior space of the baking oven can be adjusted to suit the size of food to be baked, saving baking time needed and electric power used.

A known conventional baking oven shown in FIG. 1, generally has a housing 10 of a case shape, and a front cover 11 provided to open or close up a front side, a hollow chamber in the housing 10, plural electric heating tubes 12 fixed in the housing 10, and a support rod 13 for pricking through food to be baked. As the conventional baking oven has a constant inner size for baking, whether the food is large or small, almost the same baking time and almost the electric power is needed, resulting in waste of time and electric power.

SUMMARY OF THE INVENTION

The objective of the invention is to offer a baking oven with a movable up-and-down cover to adjust an inner hollow chamber of a baking oven according to the size of food to be baked, so as to save baking time and electric power used.

The feature of the invention is a movable up-and-down cover to open or close up an open upper side of a housing, an immovable grip fixed respectively to two side walls of the cover, and a press button provided in each grip, and a connect rod connected to one end of the press button, and a coil spring positioned in each grip to push the press button back after being pressed. The other end of the connect rod has two pushers of a sloped surface and a insert hole are bored between the two pushers, an insert member positioned in each of two opposite side walls of the cover and extending to engage one of plural position insert holes of the position means fixed on two opposite side walls of the housing. Then the insert members may be pushed inward to disengage from one of the plural position insert holes by pressing the press buttons to let the cover move up and down. The height of the cover is adjusted by moving up or down relative to the housing and then release the press button, then the insert members are pushed outward to engage another position insert hole of the position means, securing the cover in its position, altering the size of the inner hollow chamber of the baking oven for placing food therein.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
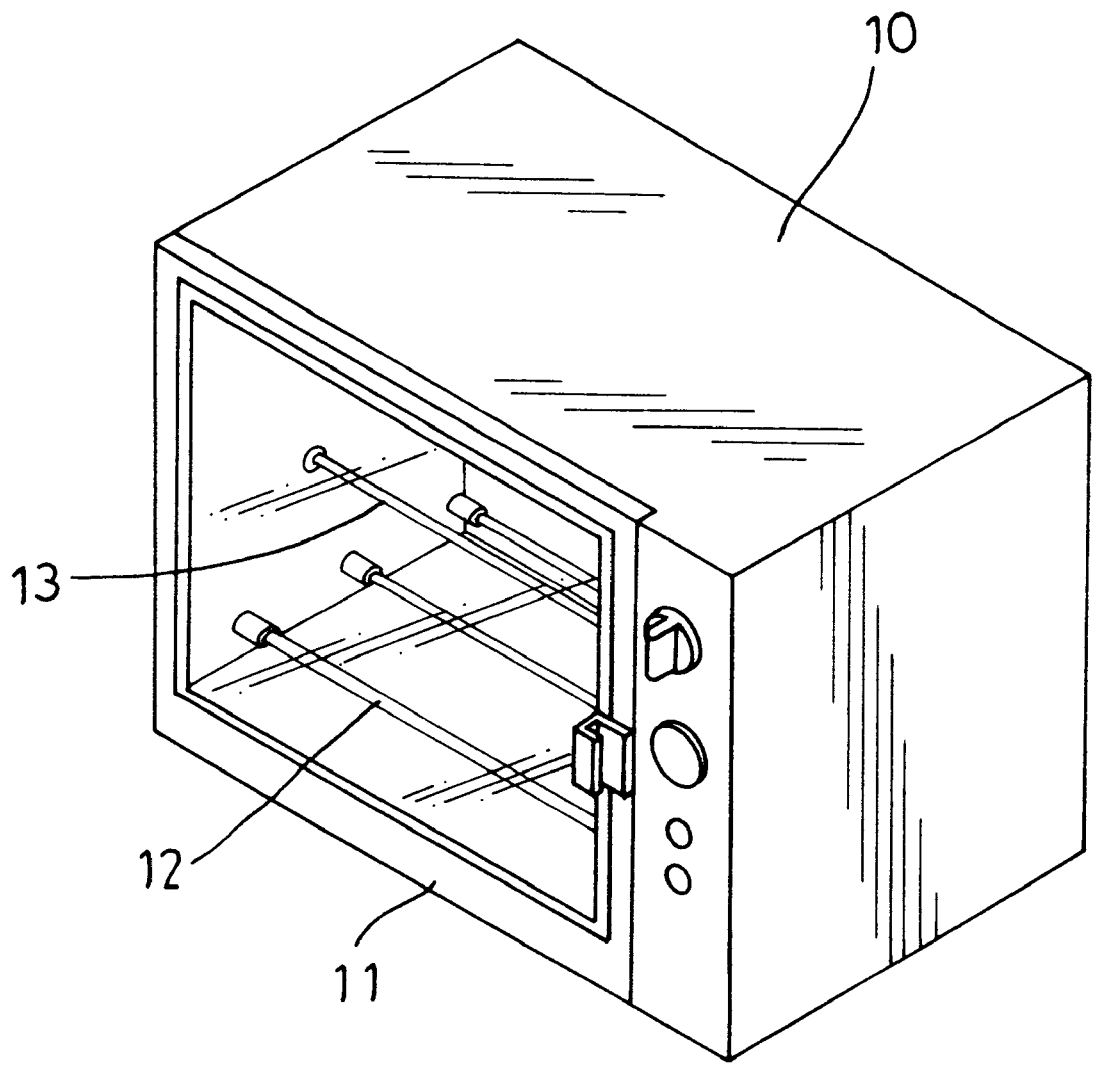
FIG. 1 is a perspective view of a known conventional oven.

A preferred embodiment of a baking oven with movable up-and-down cover in the present invention, as shown in FIGS. 2, 3, 4, 5 and 6, includes a housing 2 and a movable cover 3 as main components combined together.

The housing 2 has an inner hollow chamber 20, an open upper side, a support plate 21 respectively fixed on two opposite walls, plural grooves 210 respectively provided in the two support plates 21 to face one another, an insert rod 22 having two ends fitting in a pair of the grooves 210, and a bent electric heating tube 23 is positioned in an upper portion of the chamber between the two support plates 21. Further, a position means 24 is respectively fixed at a rear end portion of two opposite side walls of the housing 2, with a gap 240 formed respectively between the position means 24 and the two side walls of the housing 2. Each position means 24 has a slide groove 241 in an inner or side wall surface of position means 24, a sloped surface 242 on an upper end and, plural position insert holes 243 formed in the slide groove 241.

The movable up-and-down cover 3 is provided to close up or open the open upper side of the housing 2, an immovable grip 30 is respectively fixed on a front portion of two opposite side walls of the cover 3, a press button 31 provided in the immovable grip 30 and having one end connected to a connect rod 32 fixed on an inner wall surface, a coil spring 33 positioned in the grip 30 to elastically push the press button 31 outward. Each connect rod 32 has its other end provided with a pusher 34 which has a sloped surface 340 and a slide hole 341 an insert member 35 is positioned to protrude through the slide hole 341 with one end extending out of an outer wall of the cover 3. Each insert member 35 has the other end fixed with a stopper 350 engaging the pusher 34, and a coil spring 36 pushing a rear end of the stopper 350 and having the other end engaging an inner wall of the cover 3.

Figure 2:
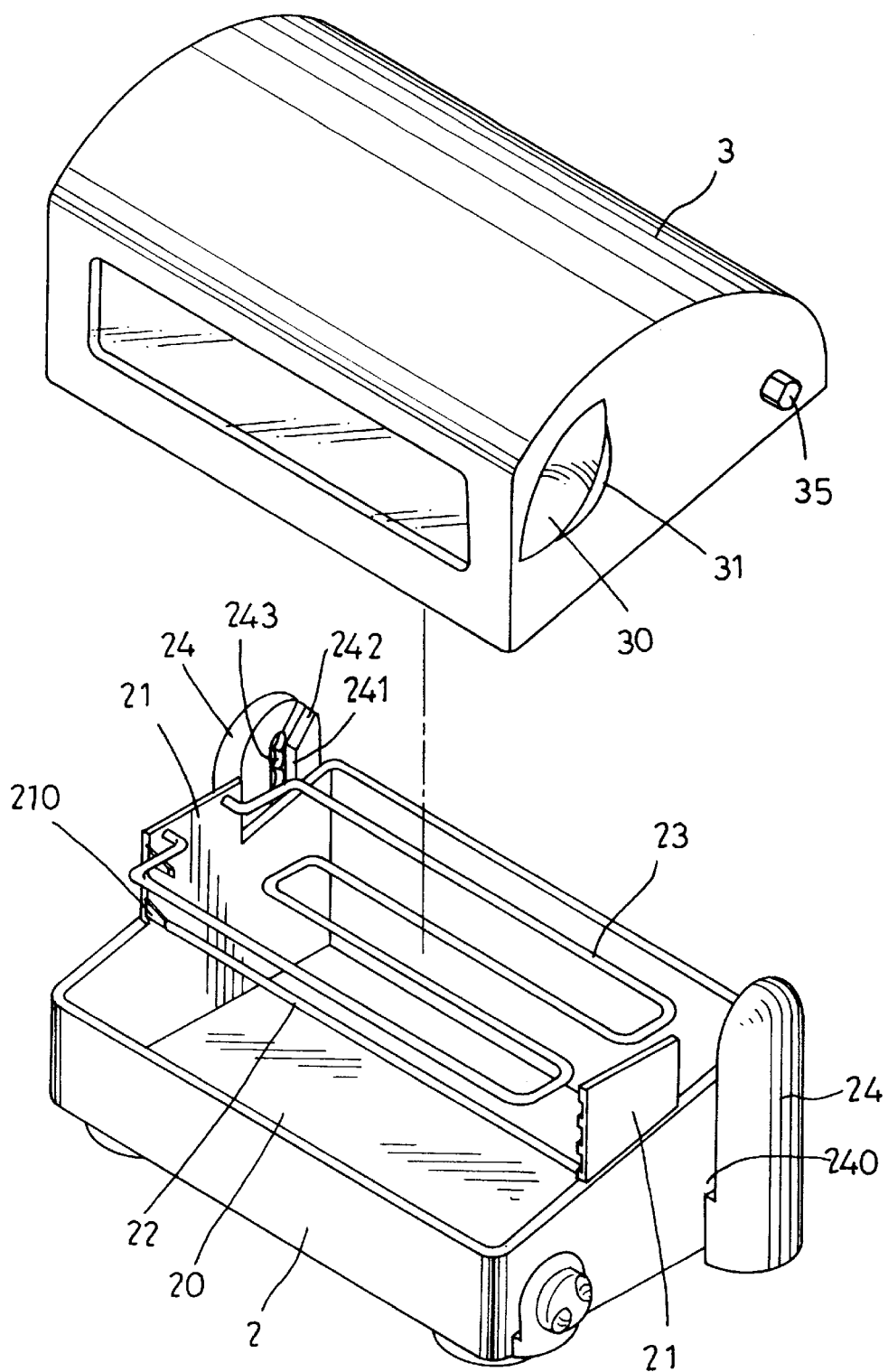
FIG. 2 is an exploded perspective view of a baking oven with a movable up-and-down cover in the present invention.
Figure 3:
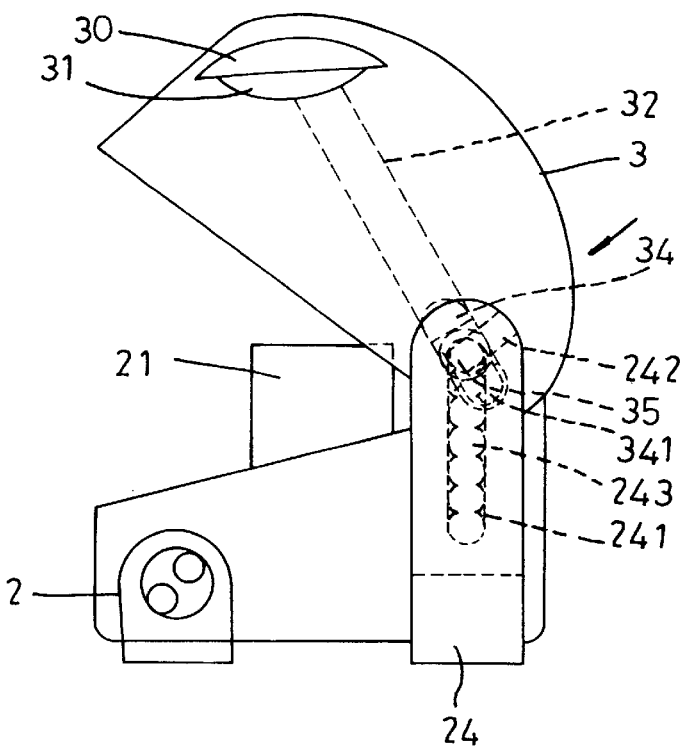
FIG. 3 is a side view of the movable up-and-down cover combined with the housing in the present invention.
Figure 5:
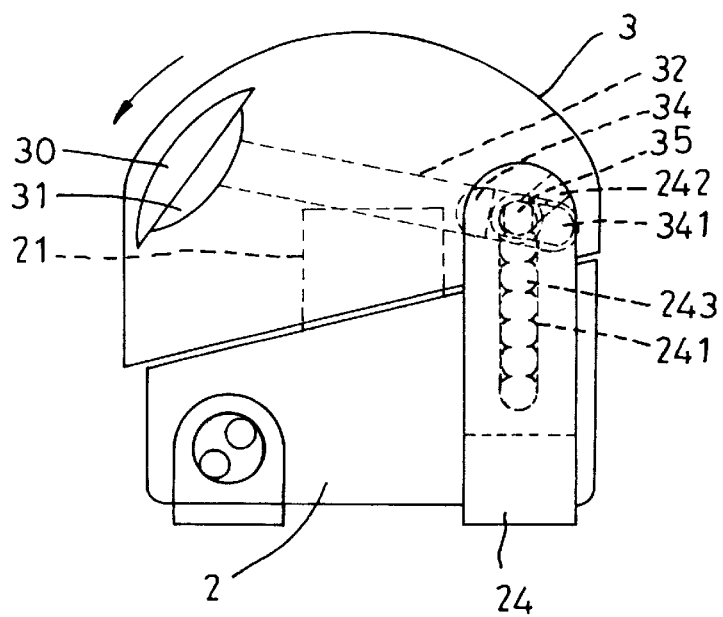
FIG. 5 is a side view of the cover swung down to close on the housing in the present invention.
Figure 4:
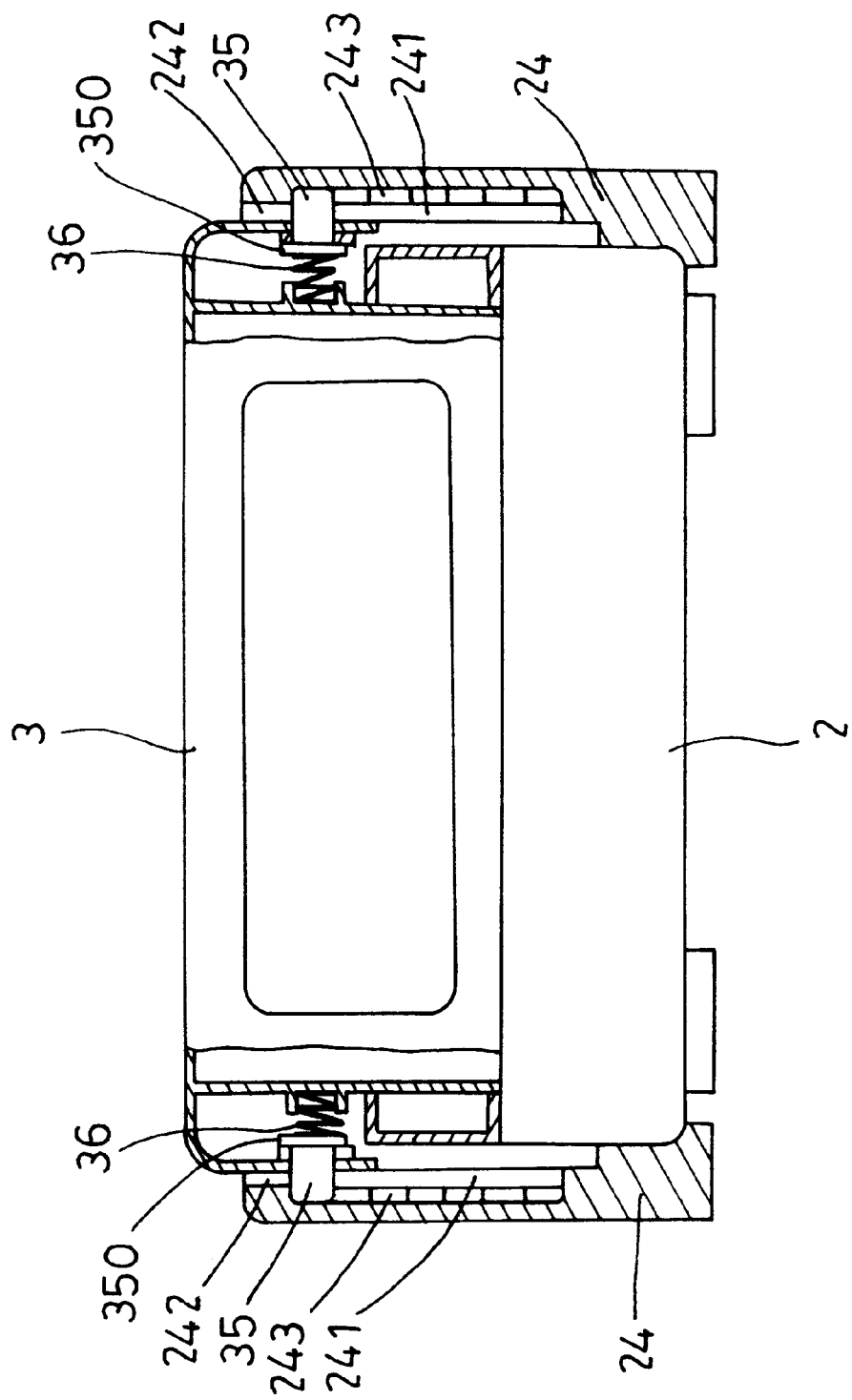
FIG. 4 is a front view of the baking oven with a movable up-and-down cover in the present invention.
Figure 7:
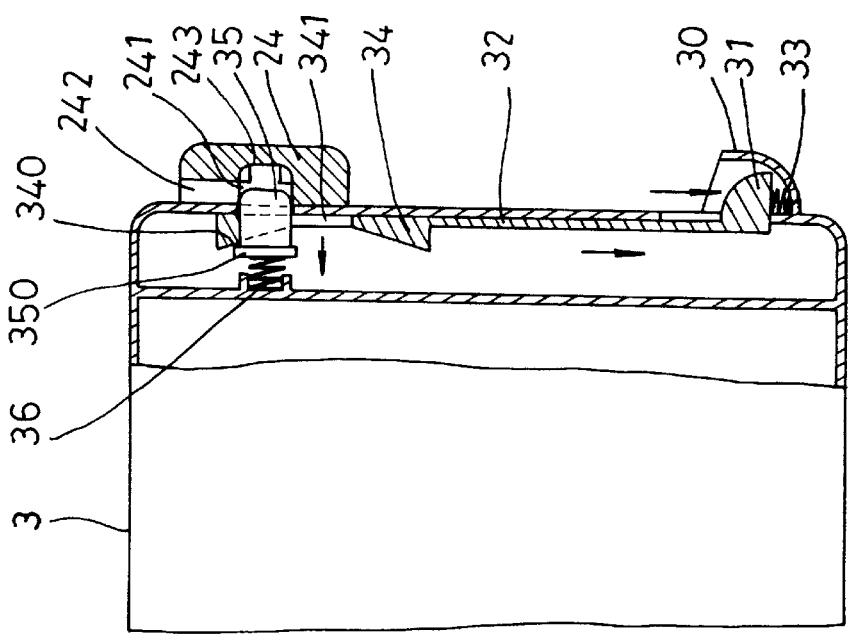
FIG. 7 is a cross-sectional view of the cover disengaged from the position means by pressing a press button in the present invention.
Figure 6:
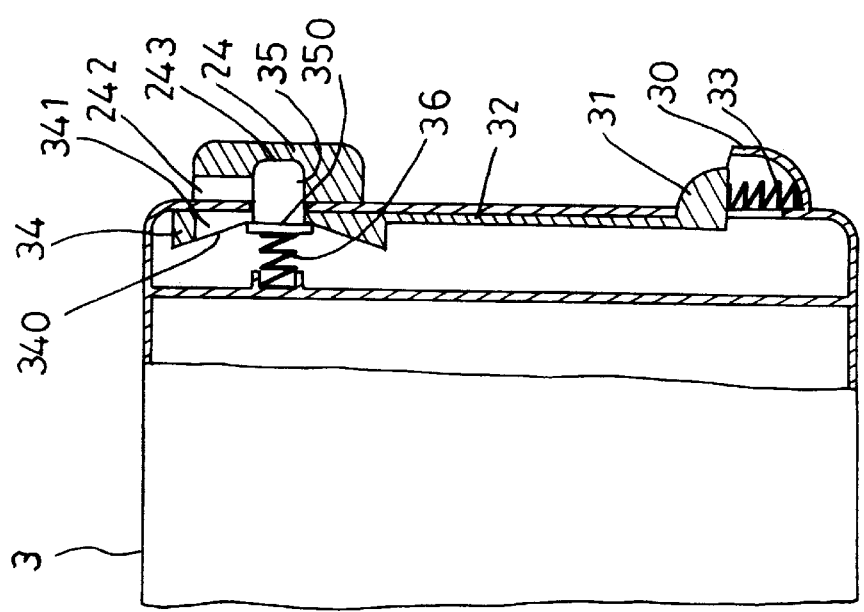
FIG. 6 is a cross-sectional view of the cover engaging a position means in the present invention.
Figure 8:
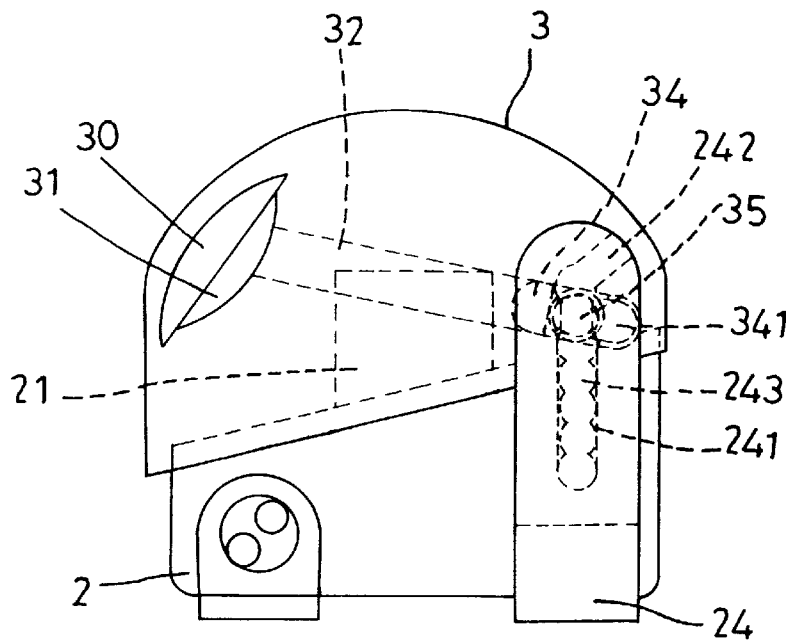
FIG. 8 is a cross-sectional view of the cover tightly closed on the housing in the present invention.
Figure 9:
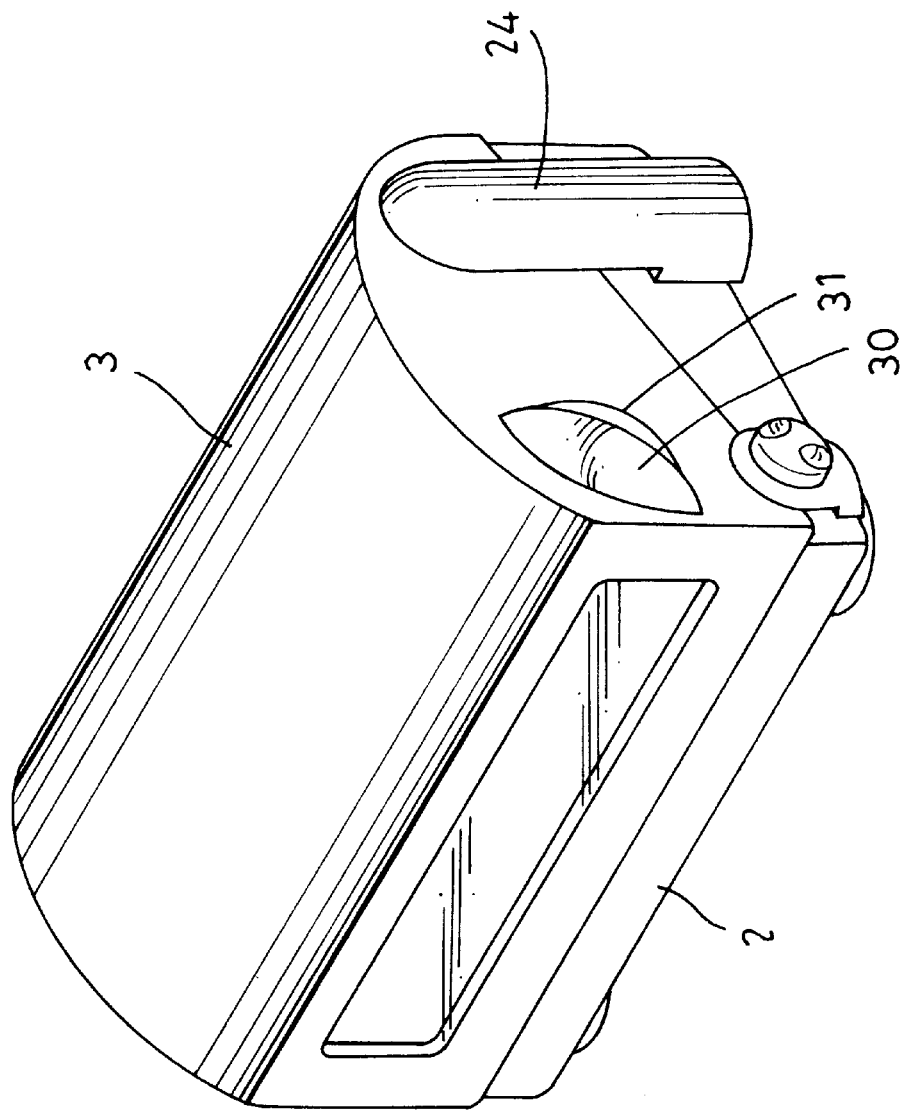
FIG. 9 is a perspective view of the baking oven with a movable up-and-down cover in the present invention; and, FIG. 10 is a cross-sectional view of the movable up-and-down cover being moved up or down relative to the position means of the housing in the present invention.

In assembling and using, referring to FIGS. 2, 3 and 4, the two insert members 35 of the two opposite walls of the cover 3 are aligned to the sloped surfaces 242 of the position means 24 of the housing 2, forcing the insert members 35 to move in the slide holes 241 via the sloped surfaces 242. Then the insert members 35 are pushed by the coil springs 36 to extend in to engage a first position insert groove 243, then the cover 3 is swung down to the left side as shown in FIG. 5, closing up the open upper side of the housing 2. At this condition, there is a gap between the housing 2 and the cover 3, so press the press button 31 of the grips 30, as shown in FIGS. 6 and 7, letting the press buttons 31 shrink inward to compress the coil springs 33, with the connect rods 32 moving together with the press buttons 31 and with the pusher 34 moved inward. Then the stoppers 350 of the insert members 35 are pushed to move inward by the sloped surfaces 340 of the pusher 34, forcing the insert members 35 to shrink in the cover 3, and the stoppers 350 are compressed by the coil springs 36, permitting the insert members 35 having the outer ends separate from the first position insert grooves 243. Then the cover 3 can move down with the insert members 35 slide along the insert holes 241, letting the cover 3 move down with the insert members 35 move and engage a second position insert grooves 243. Then the press buttons 31 are released to move back to their original positions by the coil springs 33. In addition, the press buttons 31, the connect rods 32 and the pushers 34 all move back to the original positions, with the sloped surfaces 340 no long pushing the stoppers 350, with the insert members 35 pushed by the springs 36 to extend outward, forcing the outer ends of the insert members 35 fitting in the second position insert grooves 243, securing pivotally the cover 3 with the housing 2 and closing up the open upper side of the housing 2, as shown in FIGS. 8 and 9. In this way the movable cover 3 is assembled with the housing 2 easily and quickly, separable from the housing 2 in case of need.

Figure 10:
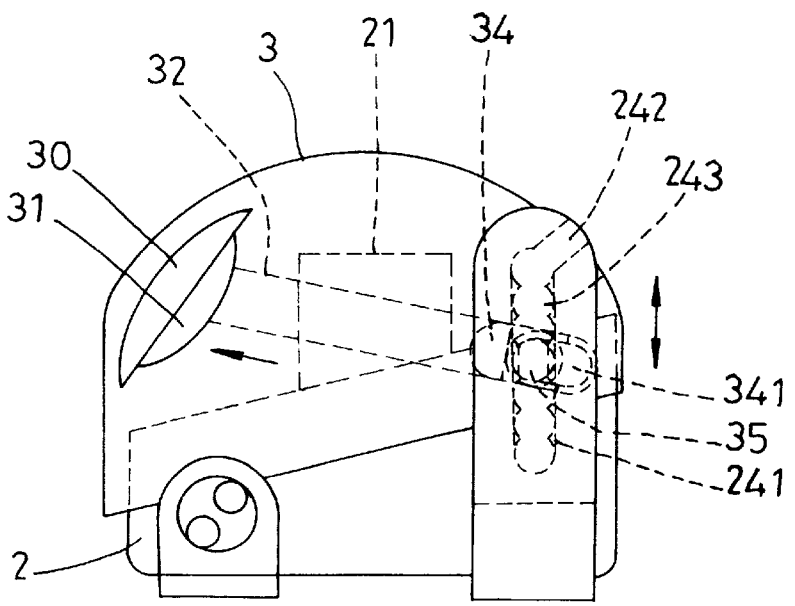

The movable cover 3 can be adjusted to move up or down relative to the housing 2, depending on the size of food placed in the housing 2, as shown in FIG. 10, with the inner chamber of the baking oven adjusted accordingly to accommodate the size of the food to be baked so as to save electric power and baking time.

The invention has the following advantages, as understood from the aforesaid description.

1. The cover is separable from the housing, making it convenient to wash and clean the baking oven.
2. Its assembly is simple and quick.
3. The cover is adjustable in its height, altering the size of the interior hollow chamber for various sizes of food to be baked, saving time and electric power.

While the preferred embodiment of the invention has been described above, it will be recognized and understood that various modifications may be made therein and the appended claims are intended to cover all such modifications that may fall within the spirit and scope of the invention.

What is claimed is:

1. A baking oven with an adjustable baking space comprising:

a housing having an interior hollow chamber, an open upper side, a support plate respectively fixed vertically on two opposite side walls, an insert rod positioned between said two support plates, a bent electric heating tube positioned on an upper portion of said hollow chamber, a position means respectively fixed on a rear portion of each of said two opposite side walls, a slide groove formed in a side wall surface of each position means, a sloped surface formed on an upper end of each slide groove, plural position insert holes formed in said slide groove;

a cover closing on said housing, said cover having an immovable grip respectively on an outer surface of said two opposite side walls, a press button positioned in each said immovable grip for pressing, one end of said press button connected to an end of a connect rod fixed on an inner wall surface of said cover, a coil spring positioned in each said grip to elastically push said press button, the other end of said connect rod being fixed with a stopper, an insert member extending through each of two opposite side walls and selectively insertable in said position insert holes of said position means of said housing, and having an inner end engaging said stopper, and a coil spring positioned between an inner vertical wall of said cover and said stopper to push said insert member outwardly of each side wall of said cover;

said press button of each said grip being pressable inwardly to move said connect rod, said stopper of said connect rod being movable to push said insert member to move inward to the inner wall of said cover to permit an insert member outer end to disengage from any of the position insert holes so that said cover may be moved up or down relative to said housing for altering the size of said inner hollow chamber to accommodate the size of food to be baked therein, saving time and electric power, said cover easy to separate from said housing for washing and cleaning said baking oven.

2. The baking oven as claimed in claim 1, wherein each said connect rod has a pusher provided with a sloped surface and a slide hole, and said insert member extending through said slide hole.

* * * * *